(12) United States Patent
Dunn et al.

(10) Patent No.: US 12,158,523 B2
(45) Date of Patent: Dec. 3, 2024

(54) LIQUID CRYSTAL POLYMER OPTICS FOR LIDAR SYSTEMS

(71) Applicant: Analog Devices, Inc., Norwood, MA (US)

(72) Inventors: Tyler Adam Dunn, North Reading, MA (US); Andrew William Sparks, Arlington, MA (US)

(73) Assignee: Analog Devices, Inc., Norwood, MA (US)

( * ) Notice: Subject to any disclaimer, the term of this patent is extended or adjusted under 35 U.S.C. 154(b) by 779 days.

(21) Appl. No.: 16/442,051

(22) Filed: Jun. 14, 2019

(65) Prior Publication Data

US 2019/0383910 A1    Dec. 19, 2019

Related U.S. Application Data

(60) Provisional application No. 62/687,105, filed on Jun. 19, 2018.

(51) Int. Cl.

| | |
|---|---|
| *G01S 17/88* | (2006.01) |
| *G01S 7/481* | (2006.01) |
| *G01S 7/4863* | (2020.01) |
| *G01S 17/10* | (2020.01) |
| *G01S 17/87* | (2020.01) |
| *G02B 1/00* | (2006.01) |

(Continued)

(52) U.S. Cl.
CPC ............. *G01S 17/88* (2013.01); *G01S 7/4811* (2013.01); *G01S 7/4816* (2013.01); *G01S 7/4863* (2013.01); *G01S 17/10* (2013.01); *G01S 17/87* (2013.01); *G02B 1/002* (2013.01); *G02B 3/0037* (2013.01); *G02B 3/12* (2013.01)

(58) Field of Classification Search
None
See application file for complete search history.

(56) References Cited

U.S. PATENT DOCUMENTS 5,903,386 A * 5/1999 Mantravadi .......... G02B 19/009
                                                                    359/853
6,867,888 B2    3/2005 Sutherland et al.
(Continued)

FOREIGN PATENT DOCUMENTS

| CN | 104792412 A | 7/2015 |
|---|---|---|
| EP | 3379214 A1 | 9/2018 |

(Continued)

OTHER PUBLICATIONS

"U.S. Appl. No. 16/365,266, Non Final Office Action mailed Aug. 12, 2022", 12 pgs.

(Continued)

*Primary Examiner* — Talha M Nawaz
(74) *Attorney, Agent, or Firm* — Schwegman Lundberg & Woessner, P.A.

(57) ABSTRACT

A detector for use in detecting reflected or scattered light pulses for a lidar system includes a primary lens, a secondary lens, and a photodiode array. The primary lens is configured to collect and focus the light pulses, the secondary lens is configured to receive and further focus the light pulses from the primary lens, and the photodiode array is configured to receive and sense the light pulses from the secondary lens. At least one of the primary lens or the secondary lens are configured using liquid crystal polymer (LCP).

20 Claims, 7 Drawing Sheets

(51) Int. Cl.
  *G02B 3/00* (2006.01)
  *G02B 3/12* (2006.01)

(56) References Cited

U.S. PATENT DOCUMENTS

| | | | |
|---|---|---|---|
| 8,300,307 | B2 | 10/2012 | Tschekalinskij et al. |
| 8,311,372 | B2 | 11/2012 | Anderson et al. |
| 8,982,313 | B2 | 3/2015 | Escuti et al. |
| 9,235,097 | B2 | 1/2016 | Meade et al. |
| 9,529,079 | B1 | 12/2016 | Droz et al. |
| 9,632,226 | B2 | 4/2017 | Waldern et al. |
| 9,647,150 | B2 | 5/2017 | Blasco Claret |
| 10,459,258 | B2* | 10/2019 | Baik ............... G06F 30/398 |
| 11,193,771 | B1* | 12/2021 | Gregory ........... G01C 19/5712 |
| 11,206,978 | B2* | 12/2021 | Hu ................... A61B 3/12 |
| 11,971,485 | B2 | 4/2024 | Dunn et al. |
| 2008/0212921 | A1 | 9/2008 | Gaylord et al. |
| 2012/0235885 | A1 | 9/2012 | Miller et al. |
| 2014/0080040 | A1 | 3/2014 | Fontecchio et al. |
| 2014/0263982 | A1 | 9/2014 | Shkunov et al. |
| 2015/0219893 | A1* | 8/2015 | Chen ................. G02B 3/0087 |
| | | | 349/200 |
| 2015/0293496 | A1 | 10/2015 | Fontecchio |
| 2016/0282453 | A1* | 9/2016 | Pennecot ............. G02B 27/62 |
| 2017/0131388 | A1* | 5/2017 | Campbell ............ G01S 7/4816 |
| 2017/0350965 | A1 | 12/2017 | Schmalenberg |
| 2018/0003805 | A1 | 1/2018 | Popovich et al. |
| 2018/0059305 | A1 | 3/2018 | Popovich et al. |
| 2018/0239021 | A1 | 8/2018 | Akselrod et al. |
| 2018/0241131 | A1 | 8/2018 | Akselrod |
| 2018/0275274 | A1* | 9/2018 | Bao ................... G01S 7/486 |
| 2018/0284440 | A1 | 10/2018 | Popovich et al. |
| 2019/0044003 | A1 | 2/2019 | Heck et al. |
| 2019/0064532 | A1* | 2/2019 | Riley, Jr. ............ G02B 1/002 |
| 2019/0098233 | A1* | 3/2019 | Gassend ............. H04N 23/73 |
| 2019/0129085 | A1* | 5/2019 | Waldern ............ G02B 6/0036 |
| 2019/0178714 | A1 | 6/2019 | Faraji-Dana et al. |
| 2019/0235230 | A1* | 8/2019 | Zemp ................. G02B 26/0833 |
| 2019/0375988 | A1* | 12/2019 | Yamamoto ......... C09K 19/586 |
| 2019/0383910 | A1* | 12/2019 | Dunn ................. G01S 17/88 |
| 2019/0383916 | A1* | 12/2019 | Gutnik ............... G01S 7/487 |
| 2019/0383943 | A1* | 12/2019 | Dunn ................. G01S 7/4811 |
| 2020/0081099 | A1* | 3/2020 | Shaltout ............. G01S 7/4814 |
| 2020/0150324 | A1* | 5/2020 | Tabirian ............. G02B 3/0087 |
| 2020/0264343 | A1 | 8/2020 | Han et al. |
| 2020/0326462 | A1* | 10/2020 | Yanai ................. G01S 17/10 |
| 2021/0396845 | A1* | 12/2021 | Marx ................. G01S 7/491 |
| 2023/0023570 | A1* | 1/2023 | Qin ................... G02B 27/0172 |
| 2023/0089314 | A1* | 3/2023 | Jennings ............ G02B 5/3041 |
| | | | 359/485.04 |

FOREIGN PATENT DOCUMENTS

| | | |
|---|---|---|
| EP | 3398007 A1 | 11/2018 |
| KR | 20170015109 A | 2/2017 |
| WO | WO-2017162999 A1 | 9/2017 |
| WO | WO-2018054852 A1 | 3/2018 |

OTHER PUBLICATIONS

"U.S. Appl. No. 16/365,266, Response filed Nov. 8, 2022 to Non Final Office Action mailed Aug. 12, 2022", 9 pgs.

"U.S. Appl. No. 16/365,266, Advisory Action mailed Apr. 6, 2023", 3 pgs.

"U.S. Appl. No. 16/365,266, Advisory Action mailed Apr. 7, 2023", 4 pgs.

"U.S. Appl. No. 16/365,266, Final Office Action mailed Jan. 25, 2023", 26 pgs.

"U.S. Appl. No. 16/365,266, Non Final Office Action mailed May 4, 2023", 16 pgs.

"U.S. Appl. No. 16/365,266, Response filed Mar. 23, 2023 to Final Office Action mailed Jan. 25, 2023", 8 pgs.

"U.S. Appl. No. 16/365,266, Final Office Action mailed Sep. 14, 2023", 16 pgs.

"U.S. Appl. No. 16/365,266, Response filed Aug. 4, 2023 to Non Final Office Action mailed May 4, 2023", 9 pgs.

"U.S. Appl. No. 16/365,266, Notice of Allowance mailed Jan. 5, 2024", 10 pgs.

"U.S. Appl. No. 16/365,266, Response filed Dec. 14, 2023 to Final Office Action mailed Sep. 14, 2023", 7 pgs.

U.S. Appl. No. 16/365,266, filed Mar. 26, 2019, Metasurface Array for Lidar Systems.

* cited by examiner

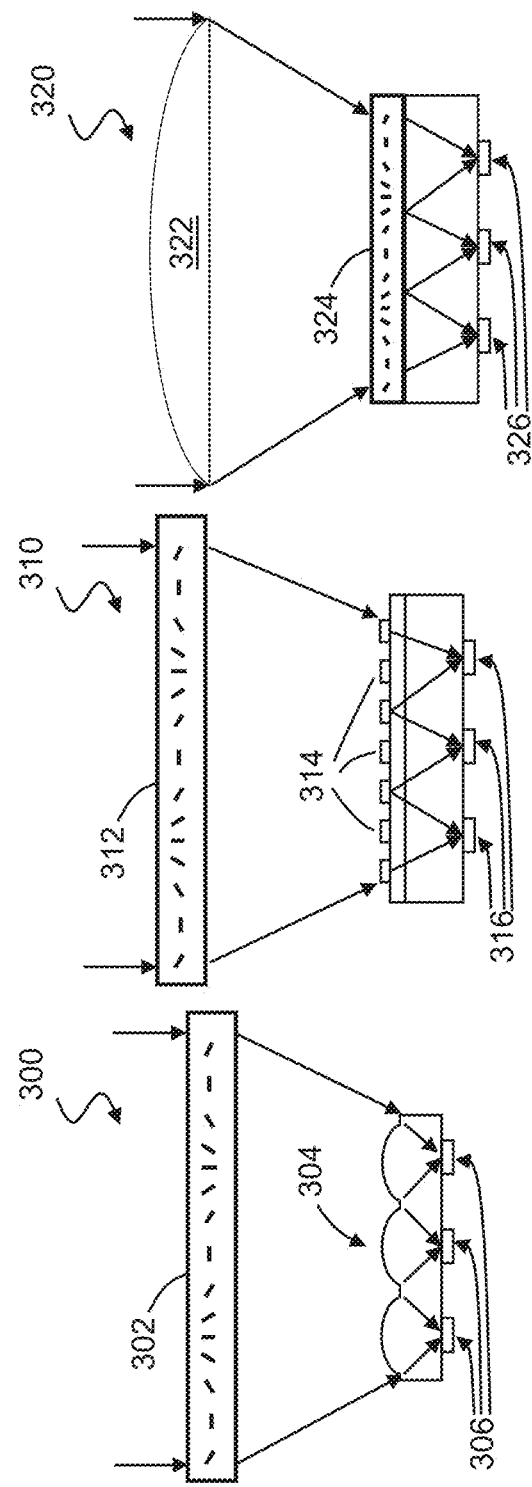

LIQUID CRYSTAL POLYMER OPTICS FOR LIDAR SYSTEMS

CLAIM OF PRIORITY

This application is a U.S. Non-Provisional Application of U.S. Provisional Application No. 62/687,105, filed Jun. 19, 2018, wherein the entire contents of which are incorporated herein by reference.

TECHNICAL FIELD

This document pertains generally, but not by way of limitation, to lidar systems, and particularly but not by way of limitation to liquid crystal polymer (LCP) optics for lidar systems.

BACKGROUND

Lidar systems are used, for example, to determine a location of a target. Pulsed laser light can be used to illuminate the target of interest, and the lidar system can collect the reflected or scattered pulses, which are sensed by one or more sensor elements. The return time and wavelength of the sensed reflections can be measured by the lidar system to determine the location of the target.

SUMMARY

It is desirable to minimize the size of the components in a lidar system. The numerical aperture (NA) of a lens is a measure of its focusing and light collection ability. NA can be calculated using the equation $n*\sin(\theta)$, where n is the refractive index of the lens, and $\theta$ is a maximum half-angle that can enter or exit the lens, which is directly related to the diameter and focal length of the lens. For lidar systems, it is desirable to maximize the diameter of the lens to collect more light, thereby increasing the signal-to-noise ratio (SNR) due to the higher signal, and minimize the focal length to reduce the die size of the photodetector array, thereby increasing the SNR due to smaller detectors having lower noise. Thus, it is desirable to achieve the highest possible NA.

The present inventors have recognized, among other things, that the use of liquid crystal polymer optics can achieve a high NA and can be straightforwardly integrated with photodiode wafers. In one example, a detector for use in detecting reflected or scattered light pulses for a lidar system includes a primary lens, a secondary lens, and a photodiode array. The primary lens is configured to collect and focus the light pulses, the secondary lens is configured to receive and further focus the light pulses from the primary lens, and the photodiode array is configured to receive and sense the light pulses from the secondary lens. At least one of the primary lens or the secondary lens are configured using liquid crystal polymer (LCP).

In another example, a method of collecting and detecting light pulses in a lidar system includes directing, by a primary lens, the light pulses received by the lidar system to a secondary lens; focusing, by the secondary lens, the light pulses to a photodiode array; and sensing, by the photodiode array, the light pulses from the secondary lens, wherein at least one of the primary lens or the secondary lens are configured using LCP.

In another example, a detector for use in detecting reflected or scattered light pulses for a lidar system includes a primary lens, an LCP grating, at least one photodiode, and a waveguide. The primary lens is configured to collect and focus the light pulses, the LCP grating is configured to receive and direct the light pulses, and the at least one photodiode is positioned to receive the light pulses from the LCP grating. The LCP grating is configured to direct the focused light pulses to the at least one photodiode through the waveguide.

Each of these non-limiting examples or aspects can stand on its own, or can be combined in various permutations or combinations with one or more other examples or aspects. This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIGS. 3A-3E are cross-sectional diagrams illustrating various examples of optical receivers.

DETAILED DESCRIPTION

An optics system is disclosed herein that is formed of one or more liquid crystal polymer (LCP) structures. Planar optical structures can include LCPs such as to deflect or focus light onto one or more photodiodes (e.g., a detector or detector array), such as included as a portion of an optical receiver in a lidar system. Lenses or other optical structures incorporating LCP materials (e.g., as primary or secondary optical elements in a lidar receiver) facilitate one or more of reduction in the size of the detector, improvement in performance, and reduction of cost. As mentioned above, planar optical structures incorporating LCP materials can provide thin, lightweight elements offering advantages as compared to macrolens structures based on curved optics. Such benefits can include ease of fabrication, an option to integrate LCP-based lenses or other components on-wafer with photodiodes, a lack of spherical aberrations, and a potential for higher performance (e.g., a higher achievable numerical aperture (NA) or higher light concentration as compared with macrolens structures). Optical structures incorporating LCP materials can deflect or focus light using geometric (or Berry-Pancharatnam) phase imparted as light passes through a thin (e.g., <10 micrometers) layer of polymerized liquid crystal. The polymerized liquid crystal can include an orientation that is intentionally varied over a surface of the optical structure. Such variation in alignment of the optical axis can be provided by patterning a template photo-alignment layer using holographic, direct-write, or other techniques, then curing a liquid crystal layer which then becomes oriented in correspondence with the template pattern. One or more layers of LCP material can be used to manipulate light, providing a relatively inexpensive and versatile platform which is well-suited to integration in an optical receiver along with other elements such as semiconductor detector structures (e.g., photodiode elements).

Figure 1:
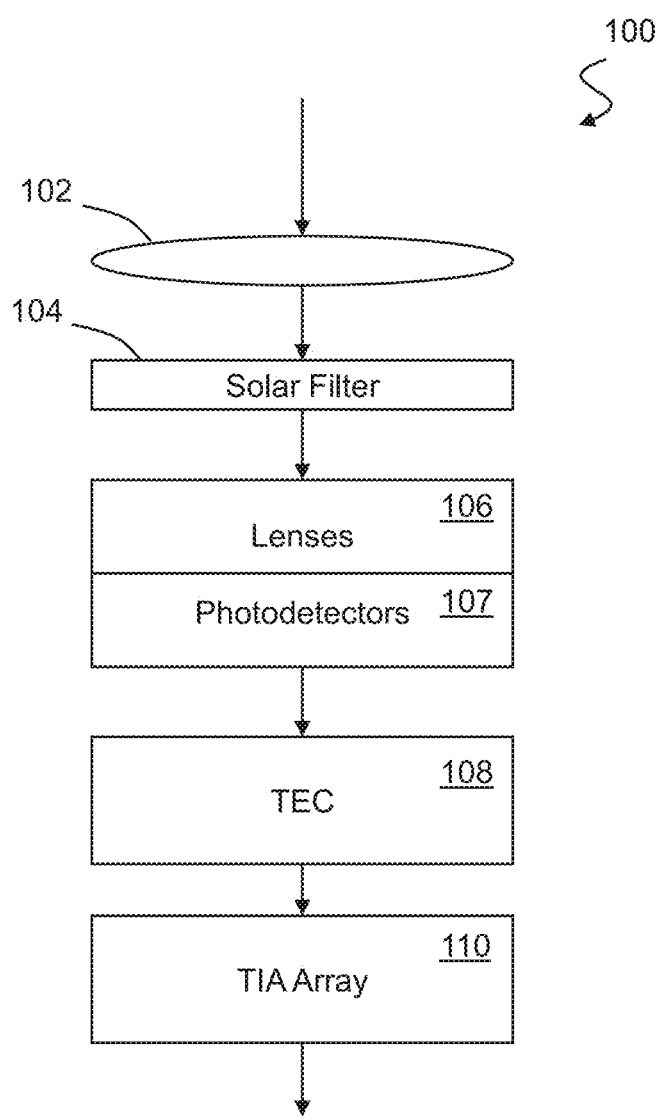
FIG. 1 is a diagram illustrating an example lidar system that includes planar lenses.

FIG. 1 is a block diagram illustrating an example lidar system 100 that can include one or more LCP structures. The lidar system 100 includes optics 102, a solar filter 104, lenses 106, photodetectors 107, thermoelectric cooler (TEC) 108, and transimpedance amplifier (TIA) array 110. Other example lidar systems can include additional and/or alternative components as the lidar system 100. The optics 102 can be microscale optics configured to receive and direct light. In some examples, the optics 102 can be implemented using LCP lenses to collect and focus light received by the lidar system 100.

The lidar system can include one or more attached light sources configured to emit an electromagnetic signal (e.g., visible light, short-wavelength infrared (SWIR), or other wavelength range) to illuminate a target. In another example, a light source separate from the lidar system can be used to illuminate the target of interest. To facilitate use of LCP lenses, the light sources may be configured to emit circularly polarized light. A reflected or scattered electromagnetic signal can be received and focused by optics 102, for example, to the lenses 106 and photodetectors 107 through the solar filter 104. In an example, the photodetectors 107 can include germanium (Ge) photodetector arrays for detection of SWIR reflections, which are more cost effective than indium gallium arsenide (InGaAs) detectors, for example. To better serve long range lidar applications, it is desirable to capture more light and/or reduce detector noise in order to improve performance.

To capture more light while minimizing noise, it is desirable to include lenses with a maximal NA. To maximize the NA, LCP optics may be used to collect and focus the received light to the photodetectors 107. LCP optics can be formed by patterning the orientation of a liquid crystal alignment layer with a desired variation over a surface, coating with liquid crystal, and curing into a polymer. The LCP optics can operate like a waveplate with birefringence that varies with position. Circularly-polarized light acquires a geometric (or "Pancharatnam-Berry") phase change through the surface of the LCP optics, as determined by the orientation of the liquid crystal at each point. This can be used to form polarization gratings and/or geometric phase lenses, which can be used for optics 102 and/or lenses 106 of the lidar system 100.

The TIA array 110 is used to convert the current received from the photodetectors 107 into voltage. The voltage can be provided to an analog-to-digital converter, for example, for conversion into a signal interpretable by a controller, processor, or other digital logic circuit. The voltages can be used by the controller or other circuit to analyze and extract information from the collected light, such as the location of a target, for example. The TEC 108 can be used to provide cooling for the lidar electronic components. The system 100 can include further components in addition to/in place of the components illustrated in FIG. 1.

Figure 2A:
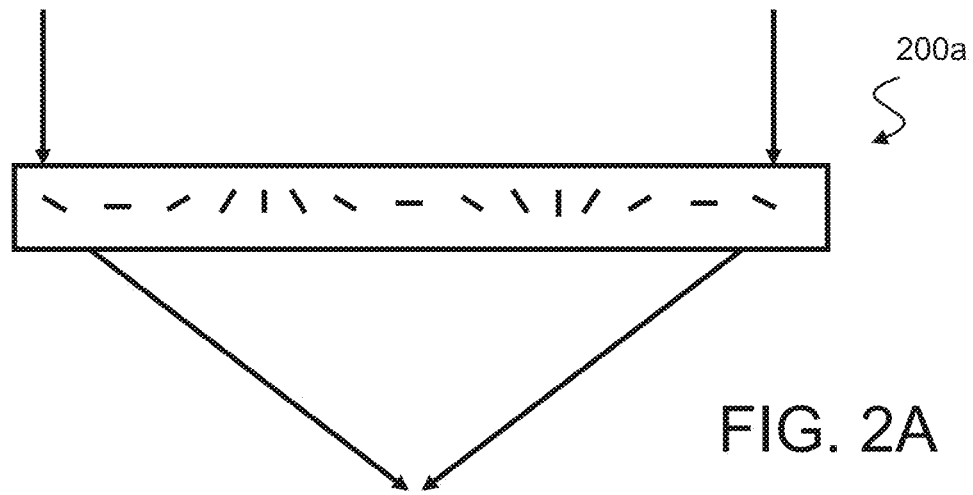
FIGS. 2A and 2B are cross-sectional diagrams illustrating example liquid crystal polymer (LCP) structures.
Figure 2B:
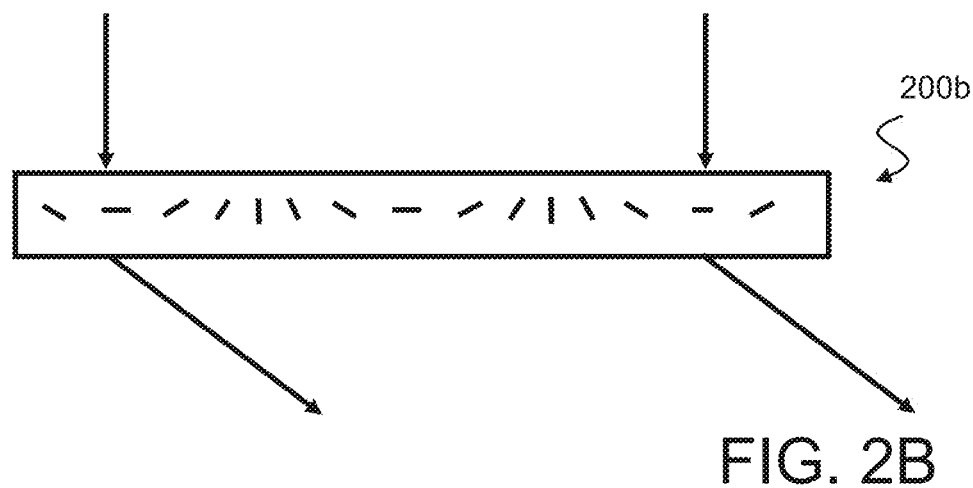

FIGS. 2A and 2B are cross-sectional diagrams illustrating examples of planar optical structures including a geometric phase lens (GPL) (FIG. 2A) and an LCP polarization grating (FIG. 2B). In FIG. 2A, a geometric phase lens (or GPL) 200a is shown, such as can focus (or diverge) incident circularly polarized light. In FIG. 2B, a polarization grating 200b is shown, which can deflect incident circularly polarized light into one or more diffractive "orders" corresponding to a specified angular direction relative to a plane of the grating structure. Structures incorporating LCP materials can be used in the lidar system 100, for example, to one or more of deflect or focus light, such as onto a one-dimensional (1D) or two-dimensional (2D) array of photodiodes. Such photodiode arrays can be used as detection elements, such as the photodetectors 107 of the lidar system 100, for example, to detect a returned optical signal reflected or scattered by a target.

Figure 3E:
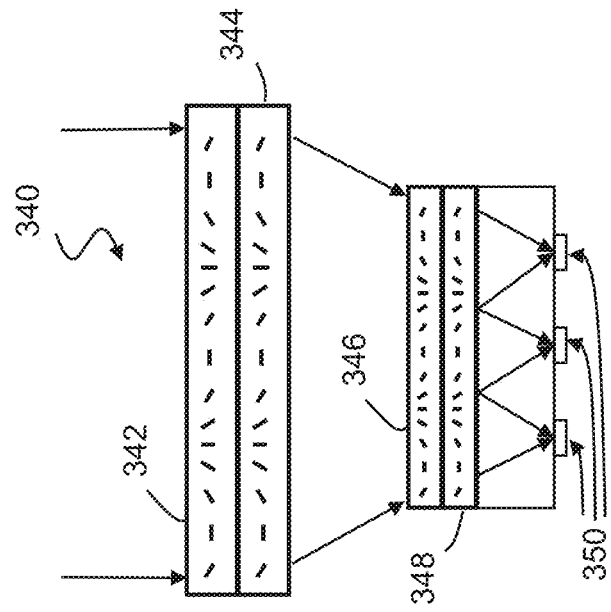

FIGS. 3A-3E are cross-sectional diagrams illustrating example structures that can be included as a portion of an optical receiver, such as optics 102, lenses 106, and photodetectors 107 of the lidar system 100. In FIG. 3A, a structure 300 includes an LCP GPL primary structure 302 and a secondary microlens array 304. The LCP GPL primary structure 302 acts as a large-aperture primary lens to receive reflected or scattered light and focus the received light to the microlens array 304. The microlens array 304 can include several microlenses positioned and configured to further focus and direct the received light to the photodiodes 306. The microlenses can be on the order of micrometers and the microlens array 304 can be directly integrated with the photodiode die, for example.

In FIG. 3B, a structure 310 includes an LCP GPL primary structure 312 with a secondary metalens array. The LCP GPL, primary structure 312 acts as a large-aperture primary lens to receive the reflected or scattered light and focus the received light to the metalens array. The metalens array includes several metasurface structures 314 that have one or more dimensions shorter than the wavelength of the received light. The dimensions of the metasurface structures 314 are controlled to focus the received light through control of the phase of the received light. The metalens array is positioned and configured to further focus and direct the received light to the photodiodes 316. The metalens array forms a planar lens that can be directly integrated with the photodiode die, for example.

In FIG. 3C, a structure 320 includes a macrolens 322 with an LCP secondary array 324. The macrolens 322 acts as a primary lens that receives reflected or scattered light and focuses the received light to the LCP GPL secondary array 324. The GPL secondary array 324 incorporates LCP materials and can be integrated with or otherwise aligned with a photodiode die that includes photodiodes 326. The LCP GPL secondary array 324 is positioned and configured to further focus and direct the received light to the photodiodes 326.

Figure 3D:
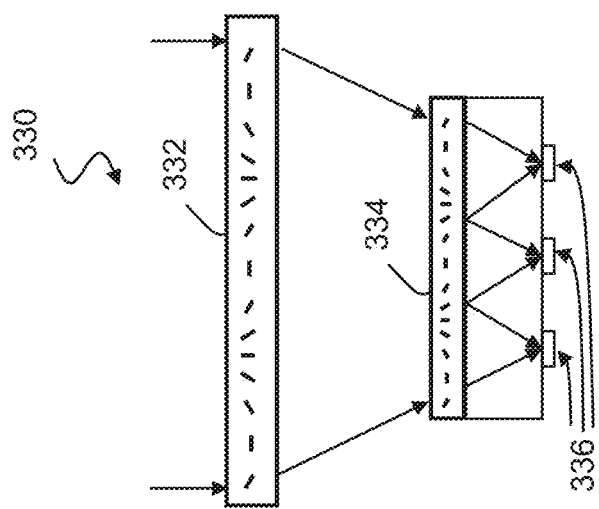

In FIG. 3D, a structure 330 includes an LCP GPL primary structure 332 with an LCP GPL secondary array 334. The LCP GPL primary structure 332 acts as a primary lens that receives reflected or scattered light and focuses the received light to the LCP GPL secondary array 334. The LCP GPL secondary array 334 incorporates LCP materials and can be integrated with or otherwise aligned with a photodiode die that includes photodiodes 336. The LCP GPL secondary array 334 is positioned and configured to further focus and direct the received light to the photodiodes 336.

In FIG. 3E, a structure 340 includes multiple primary lenses 342 and 344, and multiple secondary lenses 346 and 348. While illustrated as all being implemented using LCP GPL structures, any one or more of the primary lenses 342 and 344, or the secondary lenses 346 and 348 can be implemented using a macrolens, microlens, metalens, or other optical structure. As mentioned above, optical structures incorporating LCP materials lend themselves to integration directly with other structures, such as a semiconductor die incorporating photodiodes, such as for a lidar receiver. Co-integration enables better control of optical alignment than is generally possible in other types of mechanical assemblies.

Figure 4A:
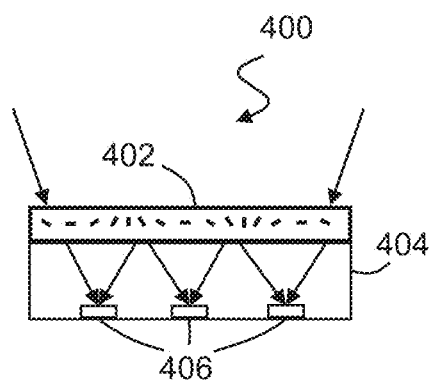
FIGS. 4A-4D are cross-sectional diagrams illustrating various examples of integrated detectors.

FIGS. 4A-4D illustrate various examples concerning LCP optical structure integrated with optical detector circuitry, such as lenses 106 and photodetectors 107 of the lidar system 100. As an illustrative example, by spinning and patterning a photo-alignment layer directly on the front side or back side of a wafer incorporating photodiodes, optical structures as described herein can be formed directly on the silicon (or other) wafer structure. In FIG. 4A, a detector 400 includes a GPL 402 that is formed directly on a wafer 404. The GPL 402 is formed on an opposite side of the wafer 404 from the photodiodes 406, which may also be integrated with the wafer 404. The GPL 402 acts as a planar lens, focusing light through the wafer 404 to the photodiodes 406.

Figure 4B:
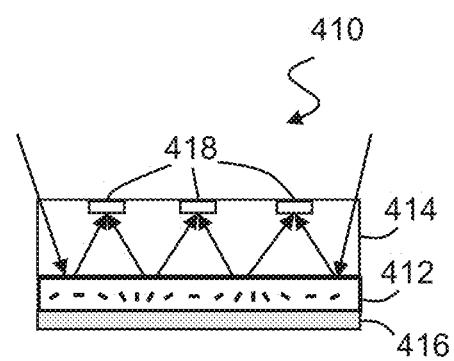

In FIG. 4B, a detector 410 includes a GPL 412 formed directly on the back side of a wafer 414 and incorporates a reflector 416. The photodiodes 418 are integrated with the wafer 414 on a side opposite the GPL 412. The reflector 416 can be a mirror coated on the backside of the die (e.g., a metallic layer), for example, such as to reflectively focus light back from the GPL 412, through the wafer 414, to the photodiodes 418.

Figure 4C:
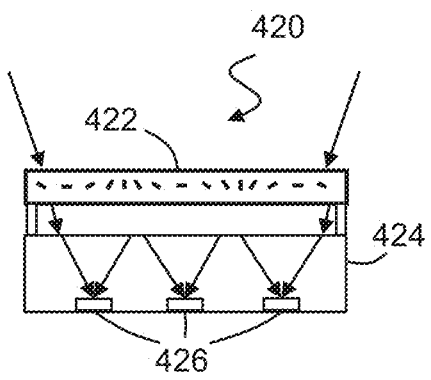

In FIG. 4C, a detector 420 includes a GPL 422 formed separate from a wafer 424. Photodiodes 426 are integrated with the wafer 424 on a side opposite the GPL 422. The GPL 422 can be formed on a separate planar structure from the wafer 424, for example, using a silicon, glass, or other substrate. The separate wafer that includes the GPL 422 can be bonded or coupled to the wafer 424 using spacers or other structures to provide a controlled separation between optical structures and the detection elements.

Figure 4D:
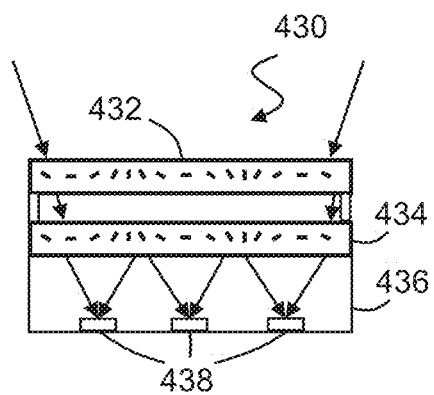

In FIG. 4D, a detector 430 includes GPLs 432 and 434. The GPL 434 is formed directly on a wafer 436, which includes integrated photodiodes 438. The photodiodes 438 are integrated on an opposite side of the wafer 436 from the GPLs 432 and 434. The GPL 432 can be formed on a separate planar structure from the wafer 436 and GPL, 434, for example, using a silicon, glass, or other substrate. The separate wafer that includes the GPL 432 can be bonded or coupled to the GPL 434 and wafer 436 using spacers or other structures to provide a controlled separation between optical structures and the detection elements. Stacking multiple optical components, as illustrated in FIG. 4D, can facilitate correction of optical aberrations (e.g., comatic or other aberrations).

Figure 5A:
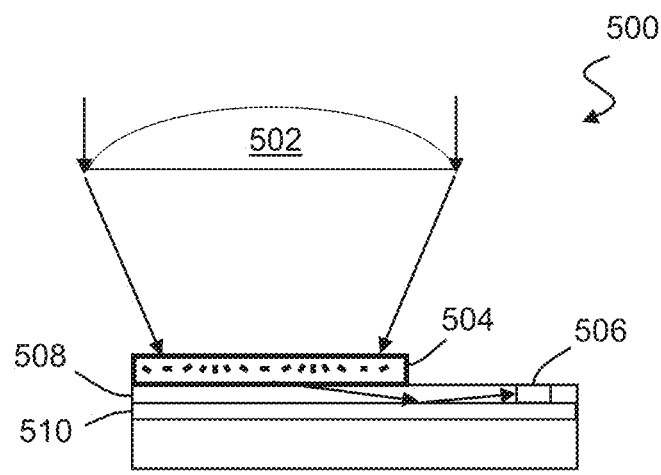
FIGS. 5A-5C are cross-sectional diagrams illustrating various examples that include liquid crystal polymer (LCP) grating structures that direct light into a waveguide.
Figure 5B:
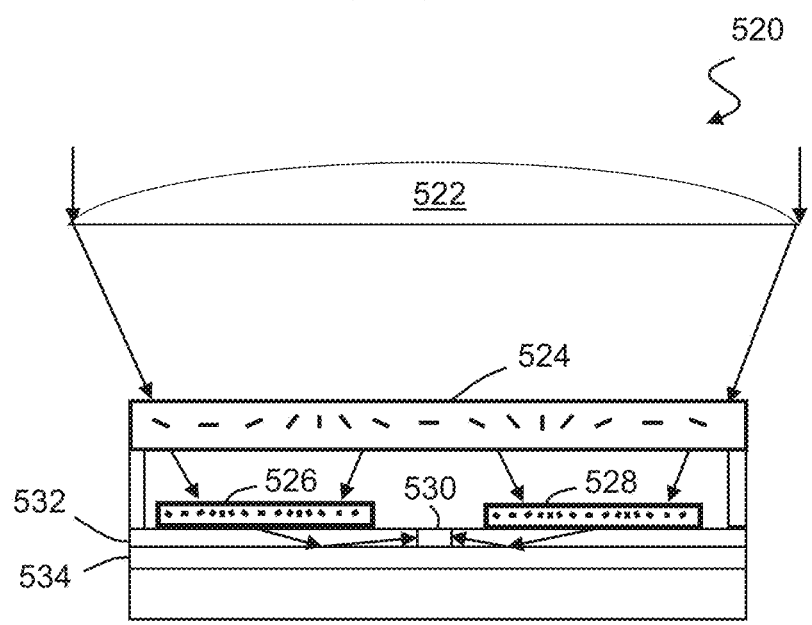
Figure 5C:
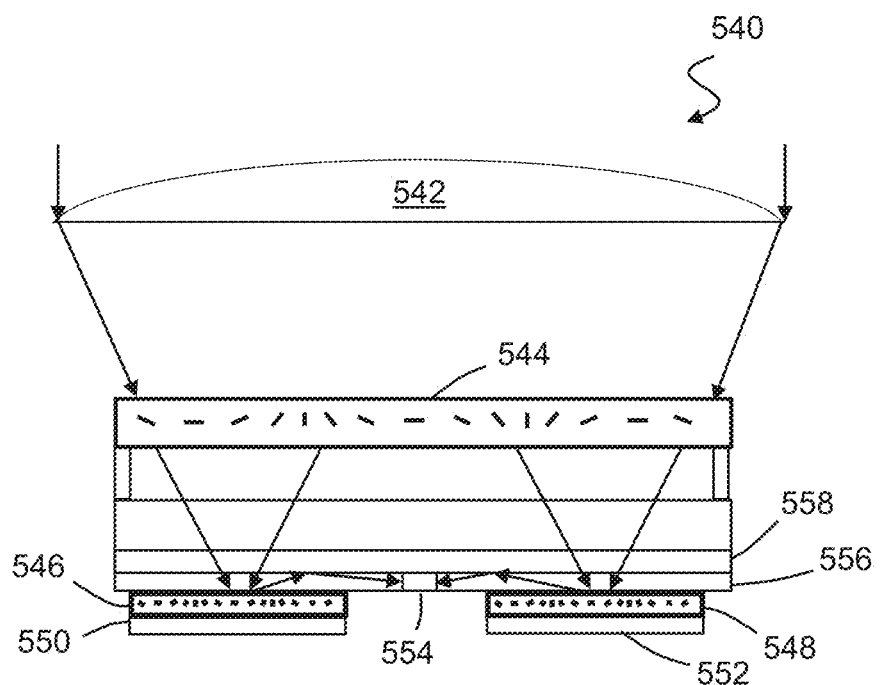

FIGS. 5A-5C are cross-sectional diagrams illustrating various examples that include liquid crystal polymer (LCP) grating structures that direct light into a waveguide. Optical receiver configurations, such as those for lidar system 100, can also be fabricated incorporating LCP gratings (e.g., polarization gratings or Bragg polarization gratings) that can be used to direct light collected in an optical receiver into a thin waveguide arranged to be co-planar with one or more photodiodes. By diffracting incoming light at a specified angle, the light remains confined in the waveguide due to total internal reflection. Such integration can facilitate reduction in the area consumed by the photodiode (along with a corresponding reduction in noise) while still collecting the photons with high efficiency.

In FIG. 5A, a detector 500 includes optics 502, LCP grating 504, a photodiode 506 and a waveguide 508 integrated on a wafer 510. Such a configuration can be referred to as a "light pipe" configuration. The optics 502, which can be a macrolens, planar LCP, or other optical structure, can direct light onto the LCP grating 502. The light is directed into the waveguide 508 by the LCP grating 502 and to the photodiode 506.

In FIG. 5B, a detector 520 includes optics 522, LCP GPL 524, LCP gratings 526 and 528, a photodiode 530 and a waveguide 532 integrated on a wafer 534. The LCP gratings 526 and 528 can achieve similar focusing and diffraction behaviors, each directing light from the optics 522 into the waveguide 532 to the photodiode 530. While illustrated as two gratings 526 and 528, any number of LCP gratings can be included. In the example illustrated in FIG. 5B, the gratings 526 and 528 provide diffraction transmissively.

In FIG. 5C a detector 540 includes optics 542, LCP GPL, 544, LCP gratings 546 and 548, reflectors 550 and 552, a photodiode 554 and a waveguide 556 integrated on a wafer 558. The LCP gratings 546 and 548 can achieve similar focusing and diffraction behaviors, each directing light from the optics 542 and the LCP GPL 544 into the waveguide 556 to the photodiode 554. While illustrated as two gratings 546 and 548, any number of LCP gratings can be included. In the example illustrated in FIG. 5C, the gratings 546 and 548 provide diffraction reflectively using reflectors 550 and 552, which can be a mirror coated on the backside of each respective grating 546 and 548 (e.g., a metallic layer), for example.

The above description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," and unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The claimed invention is:

1. A detector for use in detecting light pulses reflected or scattered by a target object of a lidar system, the detector comprising:
   a primary lens configured to receive the reflected or scattered light pulses, and collect and focus the light pulses, wherein the light pulses include circularly polarized light;
   a secondary lens configured to receive the light pulses directly from the primary lens and further focus the light pulses from the primary lens;
   a photodiode array configured to receive and sense the light pulses from the secondary lens;
   wherein at least one of the primary lens or the secondary lens includes liquid crystal polymer (LCP).

2. The detector of claim 1, wherein the secondary lens includes LCP and is integrated with a wafer, and wherein the photodiode is also integrated with the wafer.

3. The detector of claim 2, wherein the secondary lens is transmissive, and wherein the secondary lens is integrated on a first side of the wafer closer to the primary lens, and wherein the photodiode array is integrated on a second side of the wafer opposite the first side.

4. The detector of claim 2, wherein the secondary lens is reflective, and wherein the secondary lens is integrated on a first side of the wafer opposite the primary lens, and wherein the photodiode array is integrated on a second side of the wafer opposite the first side.

5. The detector of claim 1, wherein both the primary lens and the secondary lens include LCP.

6. The detector of claim 1, wherein the primary lens includes LCP and wherein the secondary lens is a metasurface lens that comprises a plurality of metasurface structures.

7. The detector of claim 1, wherein the primary lens includes LCP and wherein the secondary lens is one or more microlens structures.

8. A method of collecting and detecting light pulses in a lidar system, the method comprising:
   receiving reflected or scattered light pulses from a target object of the lidar system, wherein the light pulses include circularly polarized light;
   directing, by a primary lens, the light pulses received by the lidar system to a secondary lens;
   focusing, by the secondary lens, the light pulses received directly from the primary lens to a photodiode array; and
   sensing, by the photodiode array, the light pulses from the secondary lens, wherein at least one of the primary lens or the secondary lens includes liquid crystal polymer (LCP).

9. The method of claim 8, wherein the secondary lens includes LCP and integrated with a wafer, and wherein the photodiode is also integrated with the wafer, and wherein focusing, by the secondary lens, the light pulses to the photodiode array comprises focusing the light pulses from the secondary lens through the wafer to the photodiode array.

10. The method of claim 9, wherein the secondary lens is integrated on a first side of the wafer closer to the primary lens, and wherein the photodiode array is integrated on a second side of the wafer opposite the first side.

11. The method of claim 9, wherein the secondary lens is integrated on a first side of the wafer opposite the primary lens, and wherein the photodiode array is integrated on a second side of the wafer opposite the first side, and wherein focusing, by the secondary lens, the light pulses to the photodiode array comprises reflecting, by the secondary lens, the light pulses to the photodiode array.

12. The method of claim 8, wherein both the primary lens and the secondary lens include LCP.

13. The method of claim 8, wherein the primary lens includes LCP and wherein focusing, by the secondary lens, the light pulses to the photodiode array comprises focusing, by a metasurface lens, the light pulses to the photodiode array, wherein the metasurface lens comprises a plurality of metasurface structures.

14. The method of claim 8, wherein the primary lens includes LCP and wherein focusing, by the secondary lens, the light pulses to the photodiode array comprises focusing, by a microlens, the light pulses to the photodiode array.

15. A detector for use in light pulses detecting reflected or scattered by a target object of a lidar system, the detector comprising:
   a primary lens configured to receive the light pulses from the target object, and collect and focus the light pulses, wherein the light pulses include circularly polarized light;
   a first liquid crystal polymer (LCP) grating that includes LCP and is configured to receive and direct the light pulses from the primary lens;
   at least one photodiode positioned to receive the light pulses from the first LCP grating; and
   a waveguide, wherein the first LCP grating is configured to direct the focused light pulses to the at least one photodiode through the waveguide.

16. The detector of claim 15, further comprising:
   a secondary lens including LCP and positioned to further focus the light pulses from the primary lens to the first LCP grating.

17. The detector of claim 15, further comprising:
   a second LCP grating that includes LCP and is configured to direct the focused light pulses to the at least one photodiode through the waveguide.

18. The detector of claim 17, wherein the first and the second LCP gratings are transmissive, directing the light pulses through the first and the second LCP gratings to the waveguide.

19. The detector of claim 17, wherein the first and the second LCP gratings are reflective, reflecting the light pulses into the waveguide.

20. The detector of claim 15, wherein the primary lens includes LCP.

* * * * *